July 9, 1957  G. BOJNER  2,798,693
ROTARY HEAT EXCHANGERS
Filed Sept. 11, 1952  2 Sheets-Sheet 1
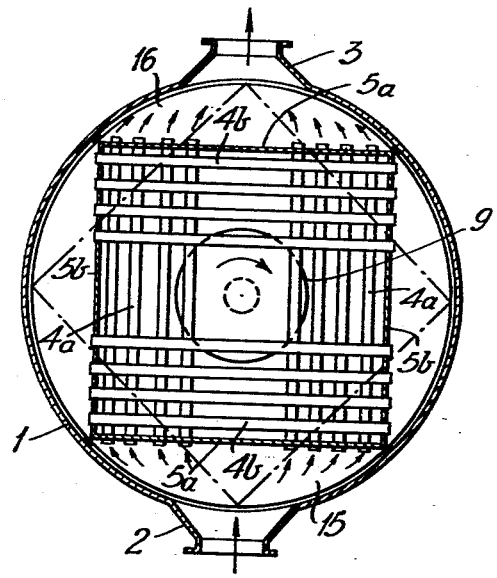
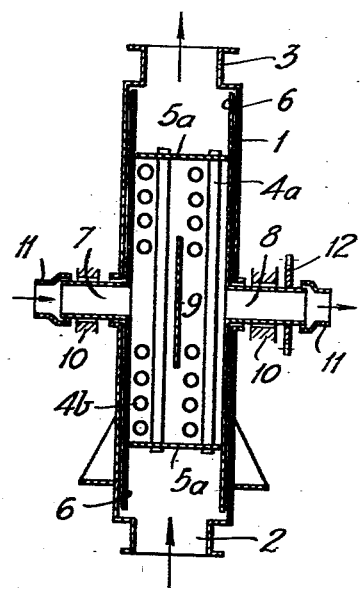
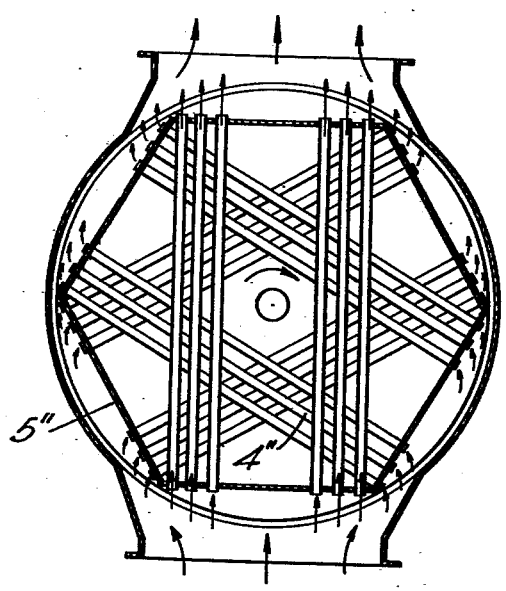
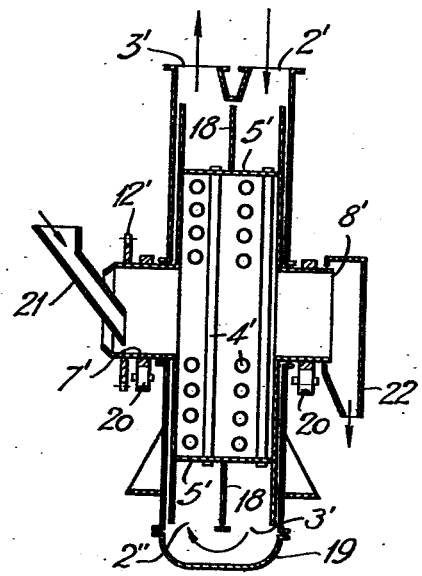
Inventor
Gustav Bojner
by Sommers & Young
Attorneys July 9, 1957  G. BOJNER  2,798,693
ROTARY HEAT EXCHANGERS
Filed Sept. 11, 1952  2 Sheets-Sheet 2
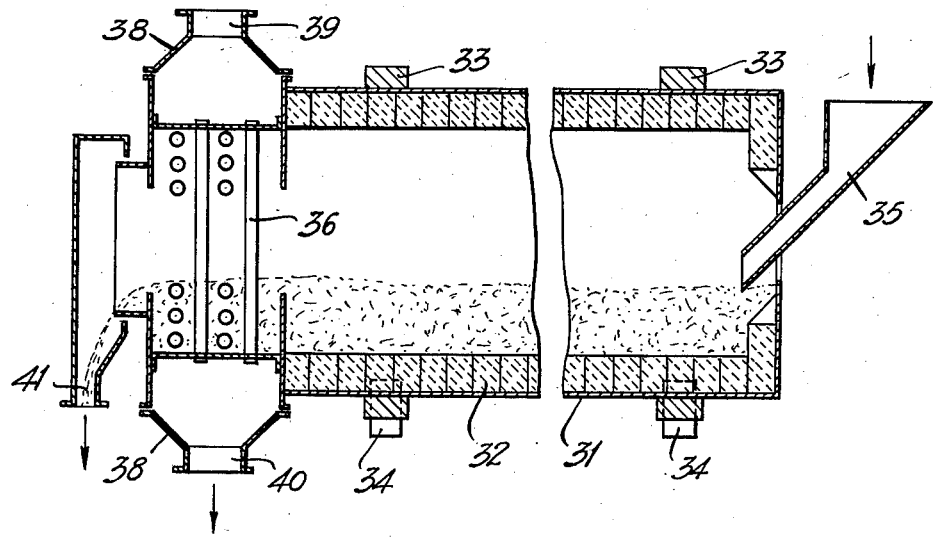
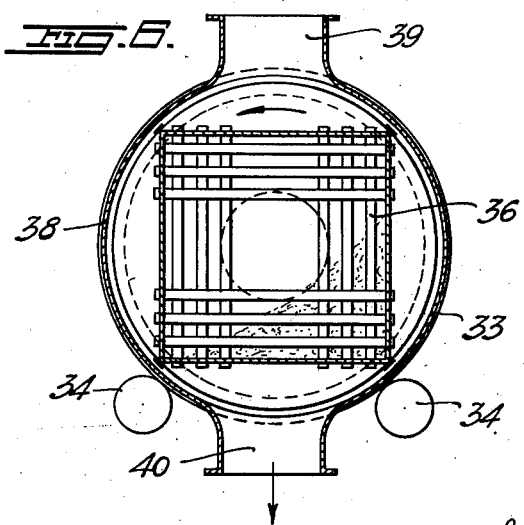
Inventor
Gustav Bojner
by Sommers & Young
Attorneys

United States Patent Office 2,798,693
Patented July 9, 1957

2,798,693

ROTARY HEAT EXCHANGERS

Gustav Bojner, Stockholm, Sweden

Application September 11, 1952, Serial No. 309,093

Claims priority, application Sweden September 17, 1951

2 Claims. (Cl. 257—92)

This invention relates to a rotary heat exchanger for thermal transmission from one medium to another medium, of the well-known type comprising a substantially cylindrical stationary housing having an inlet and an outlet for passing said one medium into and out from said housing, and a heat transmission unit mounted for rotation relative to the housing and comprising spaced tubes for connection with said inlet and outlet of the housing, said tubes constituting between themselves a closed space having an inlet and an outlet for passing said other medium through the spaces formed between the tubes.

Heat exchangers of said well-known type are generally made with axially extending tubes, whereby the axial length of the apparatus became rather great if substantial amounts of heat were to be transferred and thus a very great total heat transmission surface had to be provided in the apparatus.

The main object of the invention is to create a heat exchanger apparatus of said type, in which the disadvantage set forth above is eliminated, a short axial length being possible.

According to the principal feature of the invention the open-ended tubes of the heat transmission unit of a heat exchanger of the type set forth above extend substantially at right angles to the axis of rotation, for successive connection with an inlet and an outlet at different sides of the stationary housing, said tubes extending through an inner casing rotatably mounted in the stationary housing and having central inlet and outlet openings for passing said other medium through the spaces formed between the tubes, said rotatable casing being shaped as a polygon and having corners in rotary contact with the surrounding cylindrical housing.

According to a related feature of the invention said transversely extending tubes are divided in at least two groups, the tubes of one group being spaced from the tubes of another group in the direction of the axis of rotation, and the tubes of one group extending at an angle to the tubes of another group, said tubes providing for successive connection between the stationary inlet and outlet and, when in such connecting position, constituting the sole communication between the stationary inlet and outlet.

It is to be understood that according to the invention a very great heat transmission surface can be provided within an available space, so that substantial amounts of heat can be transferred in an apparatus of a short axial length. Moreover, by the invention the advantage is obtained that the tubes will get more uniformly cooled along their entire length, because the direction of flow within the tubes will alternate according to the rotation of the tube unit within the housing.

The advantages of the invention are attained independent of the kind of thermal transmission. Thus, an apparatus according to the invention can be utilized for heating or cooling air or other gases, for drying granulated or pulverulent materials by means of flue gases, steam or hot water as heat-emitting medium, or for cooling granulated or pulverulent materials by means of air, water or another material as heat-absorbing medium.

Further objects and features of the invention will appear from the following detailed description of an embodiment of the improved heat exchanger together with some modifications, by way of example illustrated in the accompanying drawing, in which:

Fig. 1 is an end elevation of the heat exchanger apparatus according to the invention, as seen in the direction of the axis of rotation, and in part in a transverse cross-section;

Fig. 2 is a longitudinal cross-section on the axis of rotation of the apparatus shown in Fig. 1;

Fig. 3 is a longitudinal cross-section similar to that in Fig. 2 but illustrating a modification of the apparatus.

Fig. 4 is an end elevation similar to Fig. 1 but illustrating a further modification;

Figs. 5 and 6 illustrate in longitudinal and transverse cross-sections substantially the same embodiment as Figs. 1 and 2, but combined with a rotary kiln.

In Fig. 1 reference numeral 1 indicates the housing or casing which is stationary and has a cylindrical shell, 2 is an inlet and 3 is an outlet on said housing, while 4a and 4b indicate the tubes of two groups, the tubes of one group extending at right angles with the tubes of the other group, said tubes extending also at right angles to the axis of rotation. The tubes 4a have their ends securely inserted in two tube plates 5a disposed at diametrically opposite points, and the tubes 4b are in the same way attached to the two tube plates 5b. The tube plates 5a, 5b could be curved but in the embodiment illustrated they are straight and extend substantially as chords in the cylindrical shell. The ends of the tube plates 5a, 5b reach nearly the cylindrical shell where the abutting edges are interconnected. The transverse edges of the tube plates are connected with two end plates 6 each disposed on a corresponding one of the two sides of the heat transferring unit. Thus, the plates 5a, 5b, 6 encompass the interior space of the heat transmission unit. Central neck sleeves 7 and 8 are provided on said end plates 6 for constituting inlet and outlet, respectively, to said interior space. When the medium flowing in through the inlet 7 is steam or a gas, a distributing baffle plate 9 should be provided in front of the inlet, supported from any of the end plates 6 by suitable means (not shown).

The heat transmission unit consisting of the tubes 4a, 4b is rotatably mounted within the housing, clearance being provided between the end plates 6 and adjacent end walls of the housing, as appearing from Fig. 2. On account of this clearance some heat transmission can take place also through said end plates to or from the medium passing through said clearance. A clearance could be present also between the shell of the housing and the corners formed by the tube plates 5a, 5b, but it is possible to provide sliding packing means at these points, as indicated diagrammatically in Fig. 1. Anyhow, said points or corners constitute points of rotary contact of the inner casing 5a, 5b with the circumscribing cylindrical wall of the stationary casing. Furthermore, packing means are provided between the neck sleeves 7, 8 supported in the bearings 10, and the encompassing edge of the wall of the housing, as well as between the outer ends of the sleeves 7, 8 and the stationary conduit sections 11 connected thereto, said packing means not being illustrated in the drawing as they are quite common in the art and do not constitute any part of the invention. For imparting a rotary movement to the tube body one of the sleeves, viz. the sleeve 8, is provided with a driving wheel 12, such as a sprocket or a pinion.

It is to be understood that the interior space enclosed by the plates 5a, 5b, 6 is continuously traversed by one medium, introduced through the sleeve 7, flowing through the spaces formed between the tubes, and discharged through the sleeve 8. This medium may be the heat-emitting medium. The tube plates 5a, 5b together with the cylindrical shell of the housing constitute segment-shaped distributing and collecting chambers 15 and 16, respectively, when during rotation the respective tubes have their ends approximately opposite the inlet 2 and the outlet 3. In the position illustrated in Figs. 1 and 2, the heat-absorbing medium flows through 2, 15, 4a, 16, 3, viz. substantially through the tubes 4a, upon a rotation through an angle of 90° said medium will flow substantially through the tubes 4b, and upon a rotation through an angle of further 90° said medium will flow substantially through the tubes 4a, but opposite to the direction prior to said rotation. Thus, the transversal tubes will during rotation progressively interconnect the stationary circumferential inlet and outlet openings 2 and 3. In the position indicated by dashed and dotted lines, said medium will flow through both groups of tubes.

The heat transmission unit consisting of the tubes may be divided in at least two sections connected in series, as illustrated in Fig. 3. The inlet 2' and the outlet 3" are both provided side by side, on the top portion of the housing, and partitions 18 are provided on the tube plates 5' in order to separate the two currents of the heat-absorbing medium from each other. On the bottom portion of the housing an interconnecting chamber 19 is provided connecting the outlet chamber 3' of the first section with the inlet chamber 2" of the second section. Thus, the heat-absorbing medium will flow from the inlet 2', through the right-hand tubes 4 in Fig. 3, and the outlet chamber 3' of the first section, by way of the interconnecting chamber 19, in the reverse direction through the inlet chamber 2" and left-hand tubes 4' in Fig. 3, and out through the outlet 3".

Furthermore, in Fig. 3, the reference numeral 20 indicates rollers on which the heat transmission unit is rotatably journalled by means of the neck sleeves 7', 8', and 12' indicates a driving wheel for imparting rotary movement to said unit, while 21 is a hopper supplying a hot pulverulent material and 22 is a discharge funnel for said pulverulent material. When cooling pulverulent material some of the tubes are on a small fraction of the revolution not in contact with the hot pulverulent material but have time to be cooled down.

The modification illustrated in Fig. 4 differs from the embodiment shown in Fig. 1 only therein that the tubes 4" are according to Fig. 4 divided in three groups instead of two groups, the tubes of each of said three groups being axially spaced from the tubes of another group and extending transversely at an angle with the tubes of another group. Thus, the tube plates 5" constitute a hexagon, instead of square as in Fig. 1.

The short axial length of a heat exchanger according to the invention constitutes an especial advantage in combination with rotary kilns or drums, such as used for metallurgical or other thermical processes, for example. Such a combination is illustrated in Figs. 5 and 6.

As will appear from the last-mentioned figures the drum consists of a metallic shell 31 having a refractory lining 32 and being surrounded by rings 33 supported by rollers 34 for imparting rotary movement to the drum. Hot pulverulent material is introduced through the inlet chute 35 provided at one end of the drum. Supported by the opposite end of the drum is a heat transmission tube unit 36 made substantially as the rotary tube unit of the embodiment in Figs. 1 and 2, the right-hand end plate of the tube unit constituting the left-hand end plate of the drum in Fig. 5. The interior of said unit communicates with the interior of the drum, the hot pulverulent material being conveyed through the rotary drum and the tube unit rotating therewith. The rotary tube unit 36 is surrounded by a stationary housing 38 having an inlet 39 for cooling air and an outlet 40 for the heated air, which then can be used as pre-heated air for a chemical process to be performed within the rotary drum, or for any other purpose. The product obtained from the reaction drum and cooled down in the heat exchanger 36, 38 is discharged through the stationary outlet chute 41.

Clearances together with packing means of well-known type (not illustrated) are provided between the stationary housing 38 and adjacent edges of the end plates of the rotary tube unit. Though the rotary drum has been shown in horizontal position it is to be understood that it may be slightly inclined in well-known manner in order to advance the material lengthwise through the drum.

What I claim is:

1. A heat-exchanger for indirect thermal transmission between a first medium of fluid type and a second medium capable of flowing, comprising a substantially cylindrical stationary housing, having an inlet and an outlet at opposite sides of the circumference of said housing for the passage of said first medium, an inner casing mounted within said stationary housing, for rotation within said stationary housing about the axis of said cylindrical stationary housing and in close proximity to the cylindrical surface of the same, and said inner casing having end walls provided with inlet and outlet openings, respectively, for the passage of said second medium through said inner casing, open-ended tubes extending transversally through said inner casing and providing for successively interconnecting said circumferential inlet and outlet upon rotation of said inner casing about the axis of said cylindrical casing, said transverse tubes, when in such interconnecting position, constituting substantially the sole communication between said circumferential inlet and outlet and said tubes being closed against the transmission of said first-mentioned medium when their ends are located at positions intermediate said inlet and outlet of said cylindrical casing so as to allow periods of reduced thermal differential.

2. A rotary kiln, comprising a rotatable drum having end walls one of which is provided with an inlet for a pulverulent material, a shell attached to the end of said drum opposite said inlet for rotation with said drum, said shell comprising two end plates and a circumferential wall shaped as a polygon having an equal number of sides, one of said end plates being attached to said drum and being provided with a central opening constituting an outlet from said drum and an inlet to said rotatable shell and the other said end plate having a central outlet for the passage of said pulverulent material through said shell, a stationary cylindrical casing circumscribing said shell for providing a rotary contact of the corners of said shell with said stationary cylindrical casing, said stationary casing having an outlet for the passage of a fluid material, and open-ended tubes extending through said rotatable shell substantially at right angles to the axis of rotation of said shell and providing, when rotating, for successive connection between said inlet and said outlet of the stationary casing, said tubes constituting substantially the sole communication from said inlet to said outlet of the stationary casing for said fluid material.

References Cited in the file of this patent

UNITED STATES PATENTS

| | | |
|---|---|---|
| 1,831,049 | Treschow | Nov. 10, 1931 |
| 2,037,490 | Vorkauf | Apr. 14, 1936 |
| 2,311,984 | Guild | Feb. 23, 1943 |
| 2,354,567 | Adt | July 25, 1944 |
| 2,373,382 | Christie | Apr. 10, 1945 |
| 2,496,301 | Meixl | Feb. 7, 1950 |
| 2,639,898 | Reich | May 26, 1953 |
| 2,715,517 | Bojner | Aug. 16, 1955 |

FOREIGN PATENTS

| | | |
|---|---|---|
| 16,381 | Great Britain | Aug. 11, 1899 |
| 110,394 | Germany | Jan. 22, 1899 |